United States Patent
Beyer et al.

(10) Patent No.: US 11,767,872 B2
(45) Date of Patent: Sep. 26, 2023

(54) PANEL FASTENER ASSEMBLY

(71) Applicant: A. RAYMOND ET CIE, Grenoble (FR)

(72) Inventors: Mark Allen Beyer, Armada, MI (US); James Matthew Mell, Chesterfield, MI (US)

(73) Assignee: A. Raymond et Cie, Grenoble (FR)

(*) Notice: Subject to any disclaimer, the term of this patent is extended or adjusted under 35 U.S.C. 154(b) by 352 days.

(21) Appl. No.: 16/575,001

(22) Filed: Sep. 18, 2019

(65) Prior Publication Data

US 2021/0079942 A1    Mar. 18, 2021

(51) Int. Cl.
*F16B 21/06* (2006.01)
*F16B 5/06* (2006.01)
*B60R 13/02* (2006.01)

(52) U.S. Cl.
CPC .......... *F16B 21/065* (2013.01); *F16B 5/065* (2013.01); *B60R 13/0206* (2013.01)

(58) Field of Classification Search
CPC ........ F16B 21/06; F16B 21/065; F16B 21/07; F16B 21/073; F16B 21/08; F16B 21/082; F16B 21/086; F16B 5/0088; F16B 5/065; B60R 13/0206
See application file for complete search history.

(56) References Cited

U.S. PATENT DOCUMENTS

| | | | |
|---|---|---|---|
| 2,648,885 A * | 8/1953 | Jones | A44B 17/0088 24/681 |
| 2,898,656 A * | 8/1959 | Ashworth | A44B 17/0088 24/681 |
| 3,577,603 A * | 5/1971 | Seckerson | F16B 5/065 411/510 |
| 4,778,320 A * | 10/1988 | Nakama | F16B 5/065 24/297 |
| 4,874,276 A * | 10/1989 | Iguchi | F16B 19/1081 D8/382 |

(Continued)

FOREIGN PATENT DOCUMENTS

| | | |
|---|---|---|
| EP | 1063432 A1 | 12/2000 |
| GB | 2082668 A | 3/1982 |

OTHER PUBLICATIONS

Machine assisted English translation of EP1063432A1 obtained from https://patents.google.com on Sep. 18, 2019, 5 pages.

*Primary Examiner* — Lawrence Averick
(74) *Attorney, Agent, or Firm* — WARNER NORCROSS + JUDD LLP

(57) ABSTRACT

An improved panel fastener assembly is provided and includes a panel retainer having a first connector and a sheet retainer having a second connector. One of the connectors includes a neck extending to a head that presents a flat face opposite the neck and a contact surface between the neck and an outer edge. The other connector includes a body and a plurality of resiliently deflectable locking elements that each extend from a side of the body and define a locking surface opposing a surface of the body. The panel retainer and the sheet retainer are connectable via the first and second connectors. A method of fastening together a panel and a sheet is also provided. The method comprises installing the panel retainer on a panel, anchoring the sheet retainer to a sheet, and connecting together the panel and sheet retainers via the first and second connectors.

12 Claims, 7 Drawing Sheets

(56) References Cited

U.S. PATENT DOCUMENTS

| | | |
|---|---|---|
| 5,168,604 A | 12/1992 | Boville |
| 5,580,204 A | 12/1996 | Hultman |
| 5,647,713 A * | 7/1997 | Ge ..................... B29C 45/1676 |
| | | 24/324 |
| 5,833,416 A * | 11/1998 | Cau ........................ F16B 21/02 |
| | | 411/55 |
| 7,073,230 B2 | 7/2006 | Boville |
| 7,257,867 B2 * | 8/2007 | Mizukoshi ............ F16B 21/073 |
| | | 24/453 |
| 8,316,514 B2 * | 11/2012 | Sano ...................... B60R 13/02 |
| | | 24/297 |
| 8,776,326 B2 | 7/2014 | Clarke et al. |
| 10,989,239 B2 * | 4/2021 | Rassam ................ F16B 5/0657 |
| 2006/0032030 A1 * | 2/2006 | Nessel .................... F16B 5/065 |
| | | 24/289 |
| 2007/0261332 A1 * | 11/2007 | Mohiuddin ......... B60R 13/0206 |
| | | 52/236.9 |
| 2010/0329815 A1 | 12/2010 | Jackson, Jr. et al. |

* cited by examiner

… (1)

PANEL FASTENER ASSEMBLY

FIELD OF THE INVENTION

The present disclosure generally relates to fasteners and, more specifically, to a panel fastener assembly and related methods and assemblies.

BACKGROUND OF THE INVENTION

Fasteners are used in various industries to secure panels and sheets to other structures. In the automotive industry, for example, fasteners are used to fix one component to another in a vehicle assembly, secure together various panels and/or sheets (such as in joining door liner panels to door structures), etc. Generally, such fasteners (i.e., panel fasteners) comprise two components that are each adapted to mate with the panels/sheets to be secured together and may be integrally formed (e.g. in one-piece fastener configuration) or each part of separate connectable elements (e.g. in a two-piece fastener configuration).

For example, some conventional two-piece panel fasteners utilize a pin connector and a grommet connector. During use, the pin connector is inserted into a body of the grommet connector and retained therein, thereby connecting together the pin and grommet connectors. Unfortunately, however, many conventional panel fasteners suffer from drawbacks associated with one-piece and two-piece designs alike, including permanent or semi-permanent installation preventing service, limited control over the interstitial space between the panel(s)/sheet(s) being secured together, limitations associated with installing one-piece fasteners on each panel/sheet to be joined, and disadvantages of pin-and-grommet style connections (e.g. water leakage at the connection point, etc.).

SUMMARY OF THE INVENTION

An improved panel fastener assembly is provided. The panel fastener assembly comprises a panel retainer and a sheet retainer, which are connectable to one another via first and second connectors. The panel retainer includes a panel holder and a first connector disposed at opposing longitudinal ends. The sheet retainer includes a sheet anchor and a second connector disposed at opposing longitudinal ends. One of the first and second connectors includes a neck longitudinally extending to a head, which presents a substantially flat face opposite the neck and a contact surface disposed between the neck and an outer edge of the head. The other of the connectors includes a body, which has an outwardly facing longitudinal mating side presenting a mating surface, and a plurality of resiliently deflectable locking elements, which each extend from the mating side of the body at edges of the mating surface radially disposed about a central axis. Each locking element defines a locking surface opposing the mating surface of the body. The panel retainer and the sheet retainer are connectable via the first and second connectors, such that when the face of the head is disposed adjacent the mating surface of the body the locking surface of each locking element is disposed about the contact surface of the head to prevent awayward movement between the head and the body thereby connecting together the panel retainer and the sheet retainer.

A method of fastening together a panel and a sheet using the panel fastener assembly is also provided. The method comprises installing the panel retainer on a panel, anchoring the sheet retainer to a sheet via the sheet anchor, and connecting the panel retainer and the sheet retainer via the first and second connectors, thereby fastening together the panel and the sheet.

These and other features and advantages of the present disclosure will become apparent from the following description of particular embodiments, when viewed in accordance with the accompanying drawings and appended claims.

DETAILED DESCRIPTION OF THE INVENTION

Figure 1:
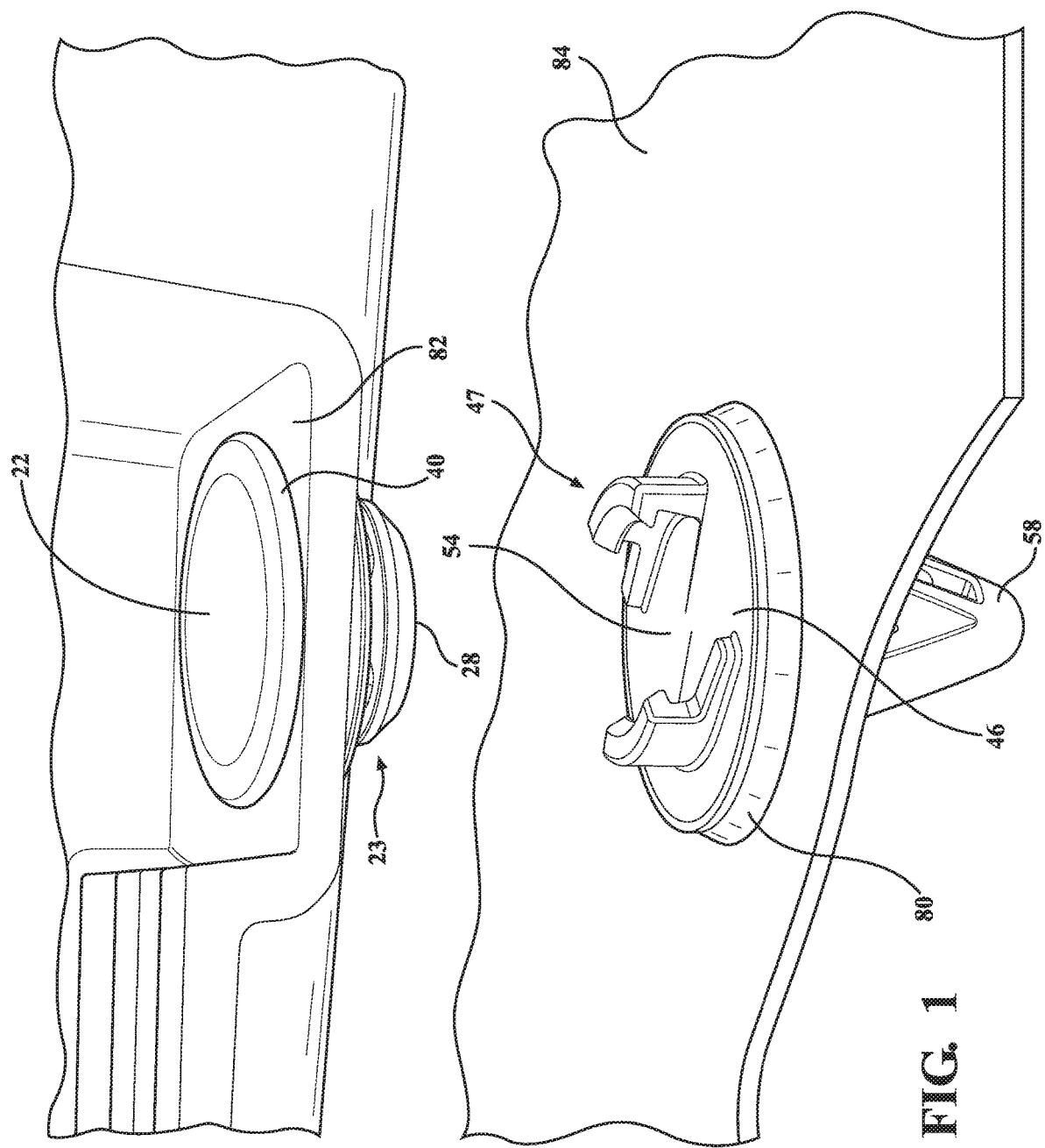
FIG. 1 is a perspective view of components of a panel fastener assembly installed on a sheet and a panel in accordance with one embodiment of the disclosure.

A panel fastener assembly is provided. As described herein, the panel fastener assembly is adapted for coupling (i.e., fastening) together a panel and a sheet. As will be appreciated in view of the description herein, the design and material construction of the panel fastener assembly provide increased usability and/or convenience. In particular, the panel fastener assembly may be used to releasably fasten together various panels/sheets, providing increased serviceability.

Referring generally to the Figures, wherein like numerals indicate corresponding parts throughout the several views, the panel fastener assembly is illustrated and generally designated at 20. Certain features of the panel fastener assembly 20 are functional, but can be implemented in different aesthetic configurations. In general, the panel fastener assembly 20 comprises two components, a panel retainer 22 and a sheet retainer 46, which are adapted to be connected together, optionally in a releasable manner, as described in further detail below. Like the panel fastener assembly 20 as a whole, certain features of the panel retainer 22 and the sheet retainer 46, individually, are functional, but can be implemented in different aesthetic configurations.

As will be understood in view of the Figures and the description of particular embodiments herein, each of the panel retainer 22 and the sheet retainer 46 comprises a connector, such that the panel fastener assembly 20 includes a pair of connectors. The design and material construction of the connectors provide the panel fastener assembly 20 with increased usability, customizability, convenience, and serviceability. In general, each of the connectors is different from the other in design and function, but the connectors are collectively adapted to be cooperatively joined/coupled together (i.e., to connect together the panel retainer 22 and the sheet retainer 46). As will be understood by those of skill in the art, one of the pair of connectors may be designated or otherwise described as a "male" and/or "plug" type connector, and the other of the connectors may be designated or otherwise described as a "female" and/or "jack" type connector.

For reference herein, the connector of the panel retainer 22 is designated as the "first connector 23," and the connector of the sheet retainer 46 as the "second connector 47". As illustrated by the embodiments of the Figures and described in further detail herein, the panel fastener assembly 20 may be configured such that the first connector 23 of the panel retainer 22 is the "male" type connector and the second connector 47 of the sheet retainer 46 is the "female" type connector (i.e., the "first configuration") or, alternatively, such that the first connector 23 is the "female" type connector and the second connector 47 is the "male" type connector (i.e., the "second configuration").

Figure 2:
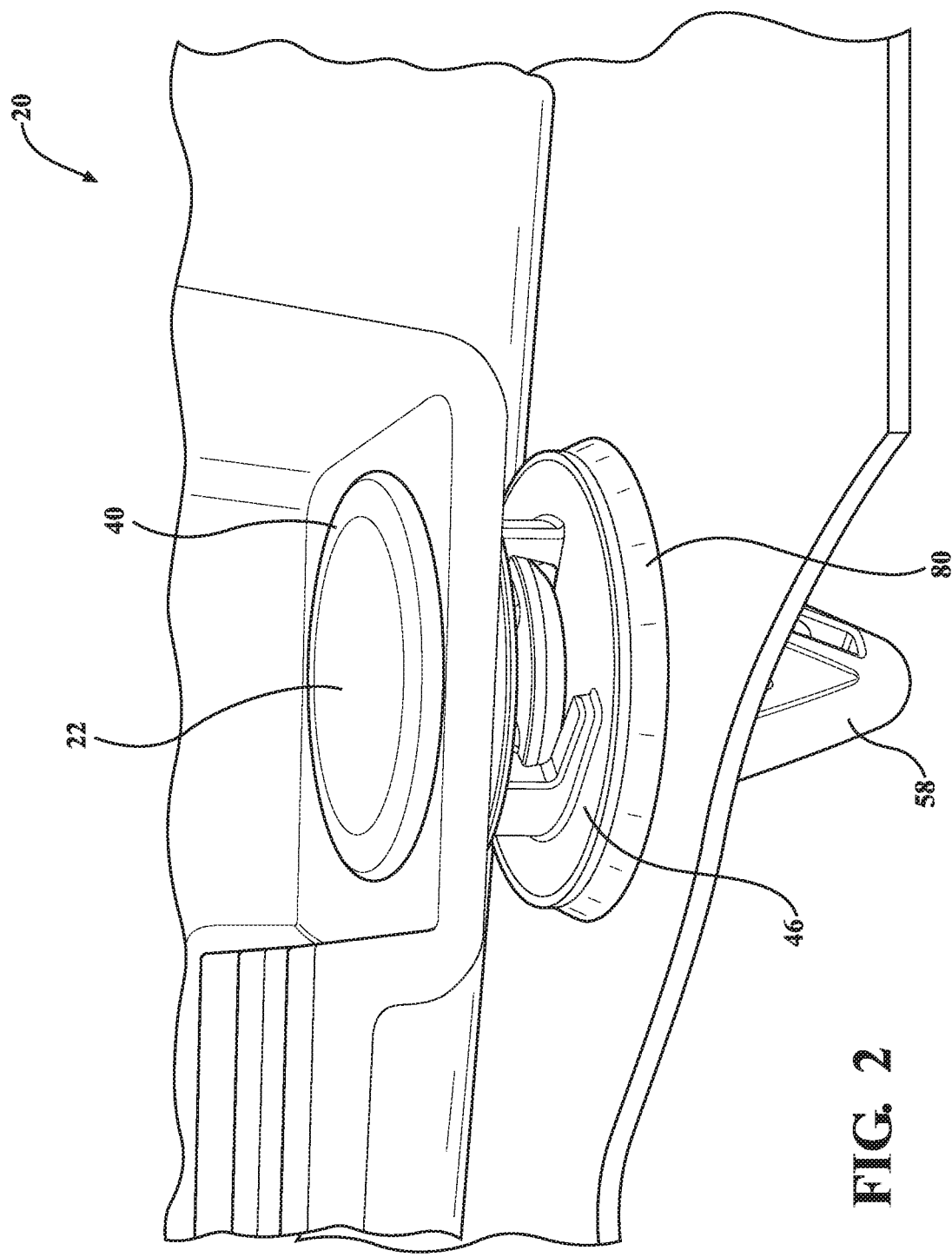
FIG. 2 is a perspective view of a sheet and a panel fastened together with the panel fastener assembly of FIG. 1.
Figure 3:
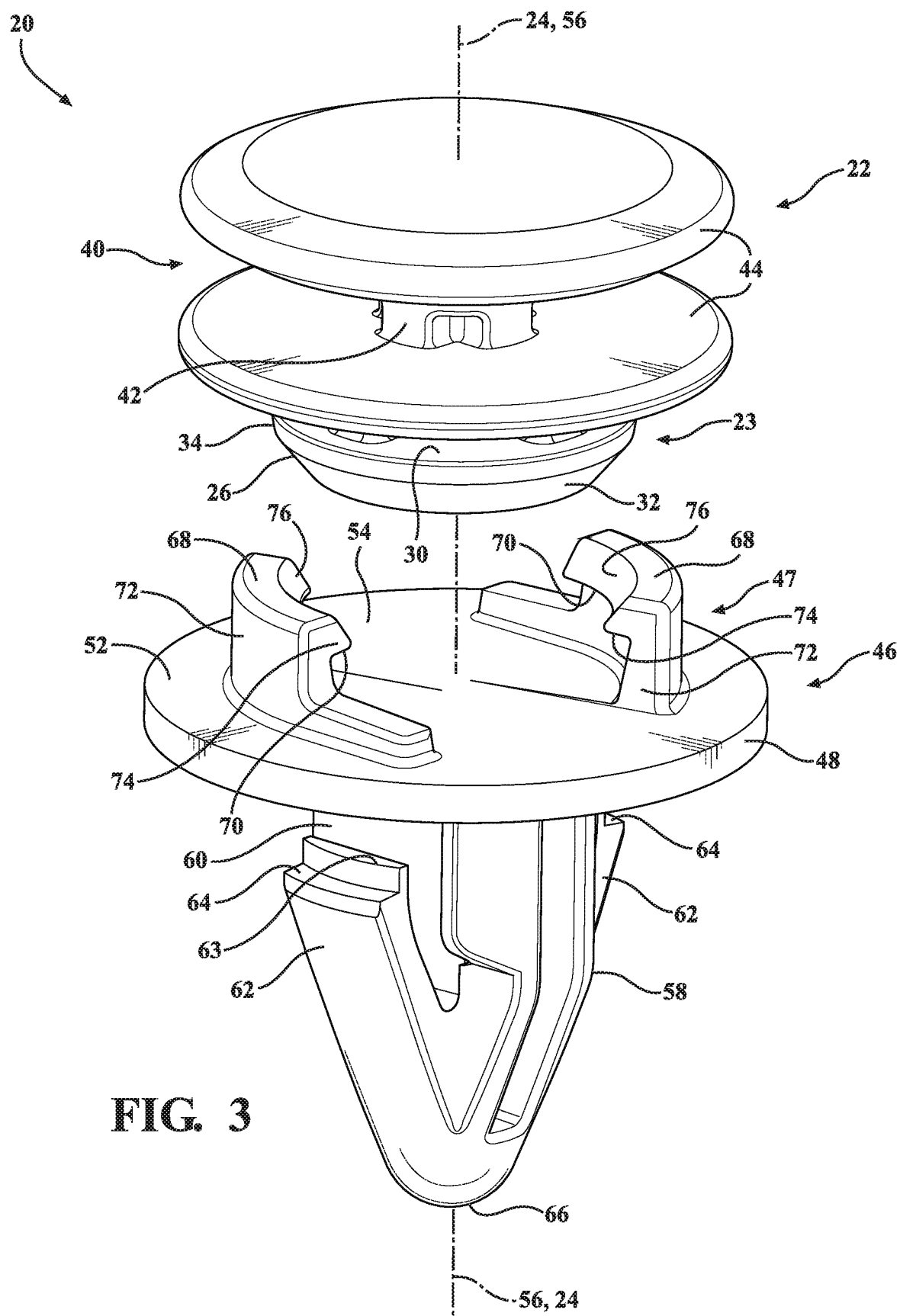
FIG. 3 is a perspective view of individual components of the panel fastener assembly in accordance with another embodiment of the disclosure.
Figure 4:
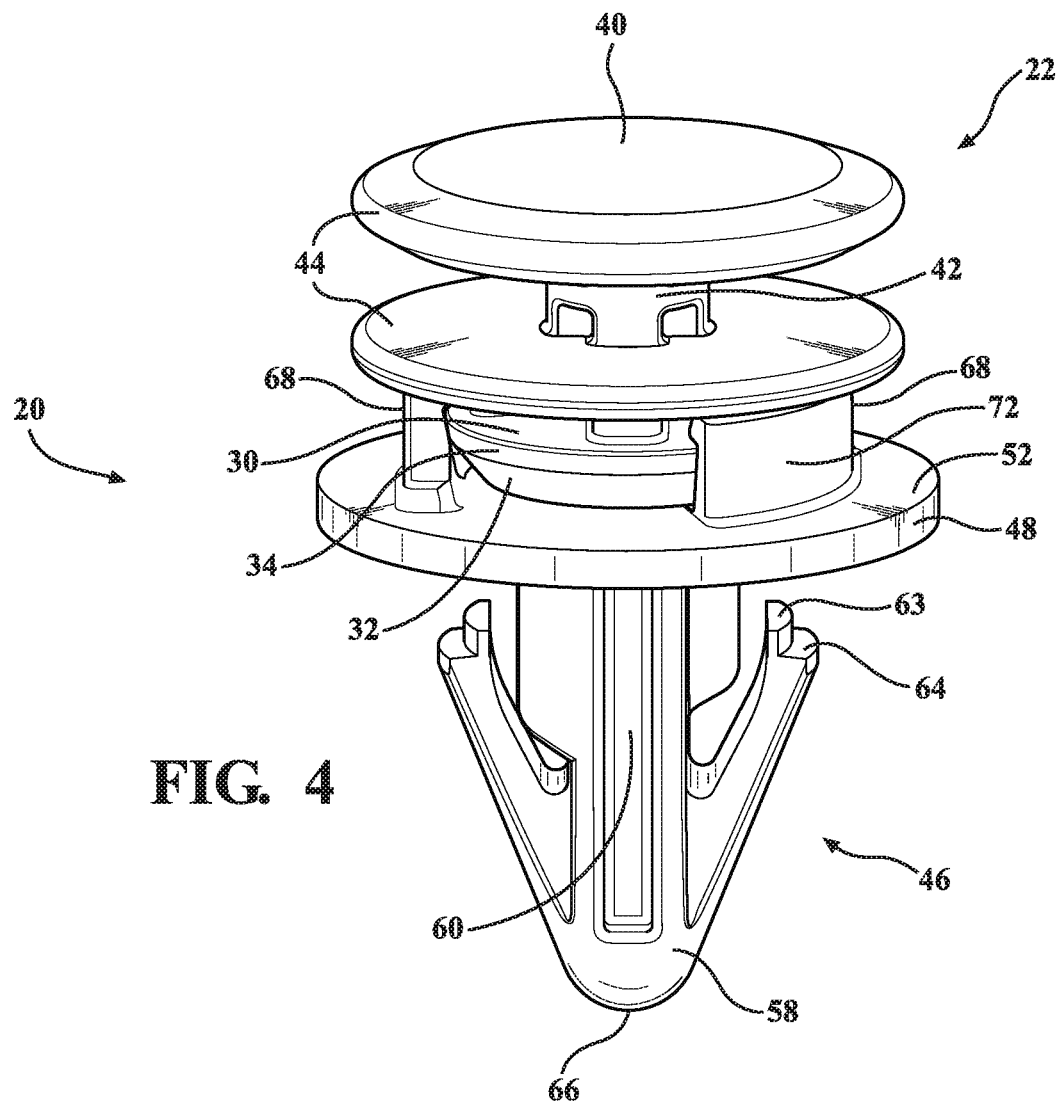
FIG. 4 is a perspective view of interconnected components of the panel fastener assembly in accordance with an additional embodiment of the disclosure.
Figure 5:
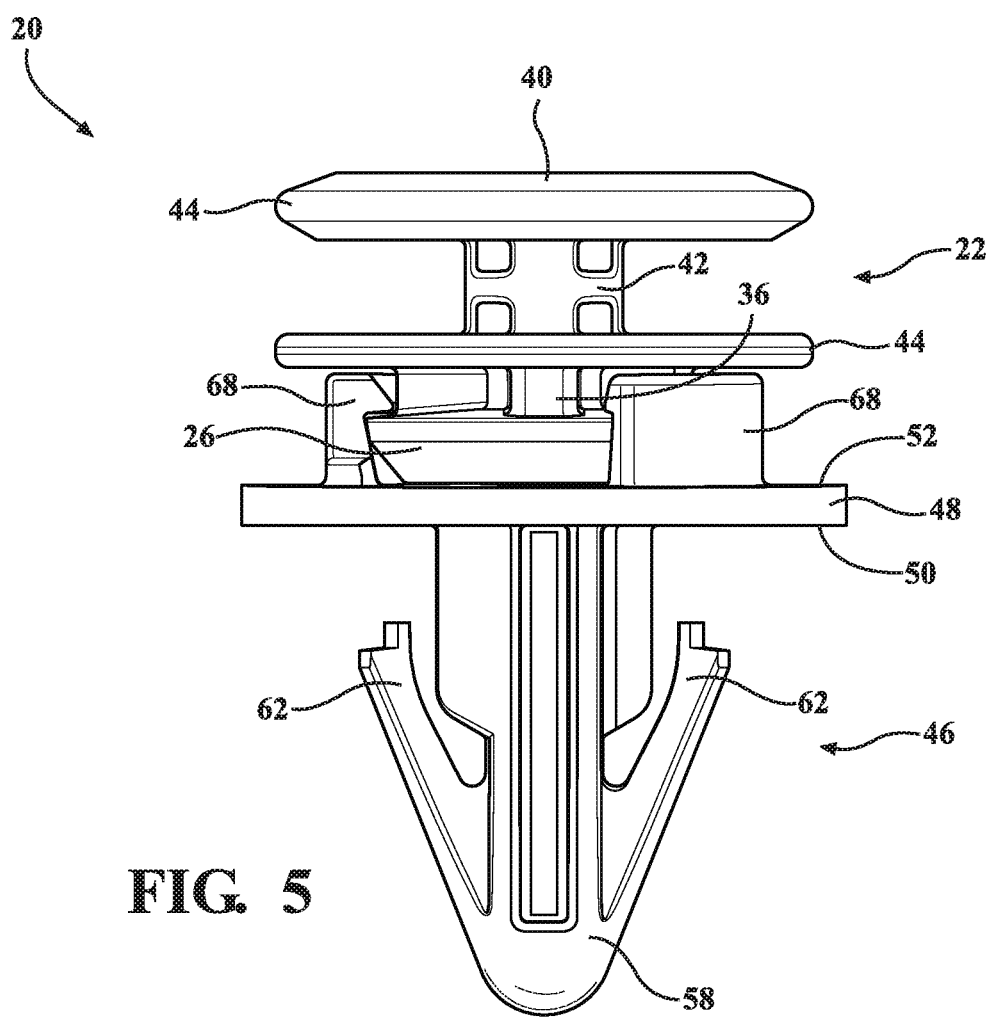
FIG. 5 is a side elevation view of the interconnected components of the panel fastener assembly of FIG. 4.
Figure 6:
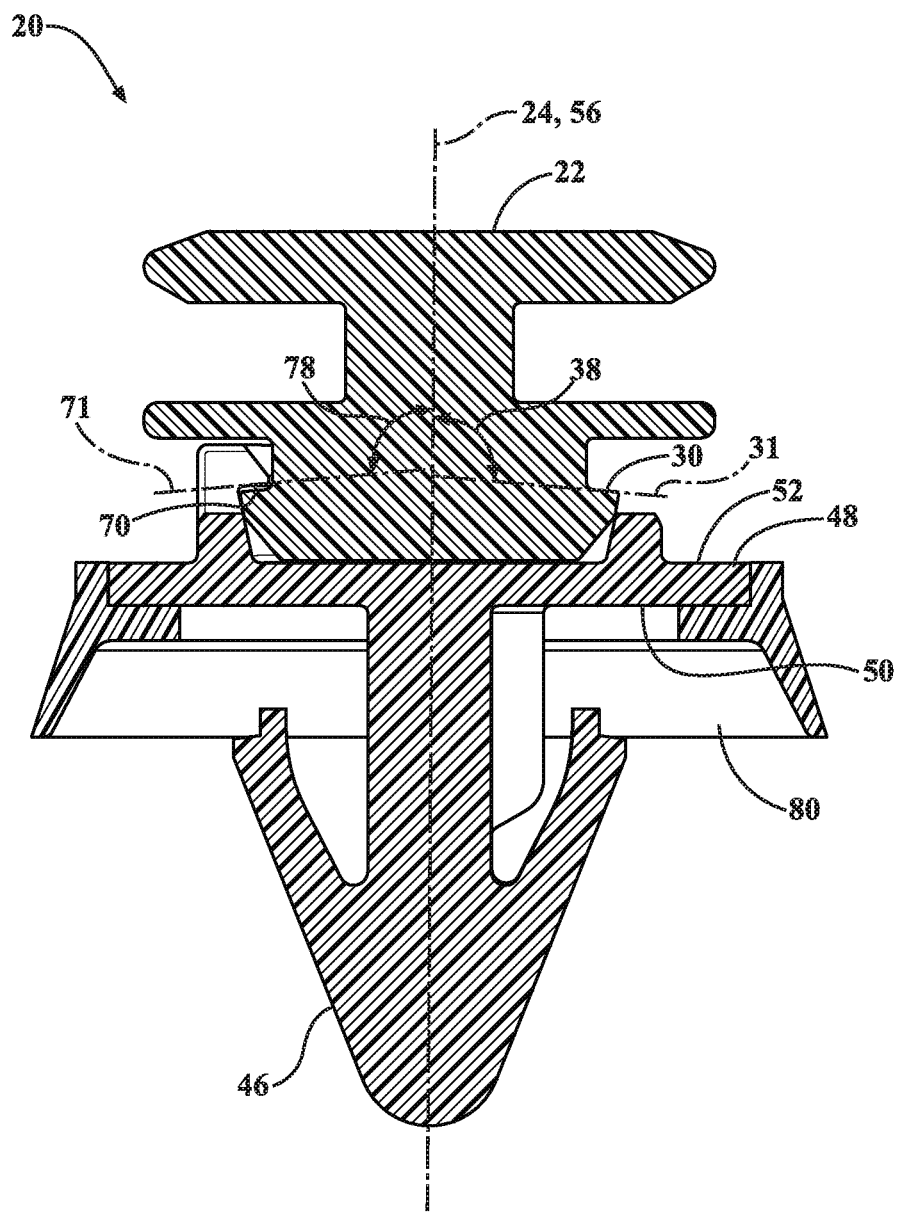
FIG. 6 is a cross-sectional view of the panel fastener assembly including a seal in accordance with one embodiment of the disclosure.
Figure 7:
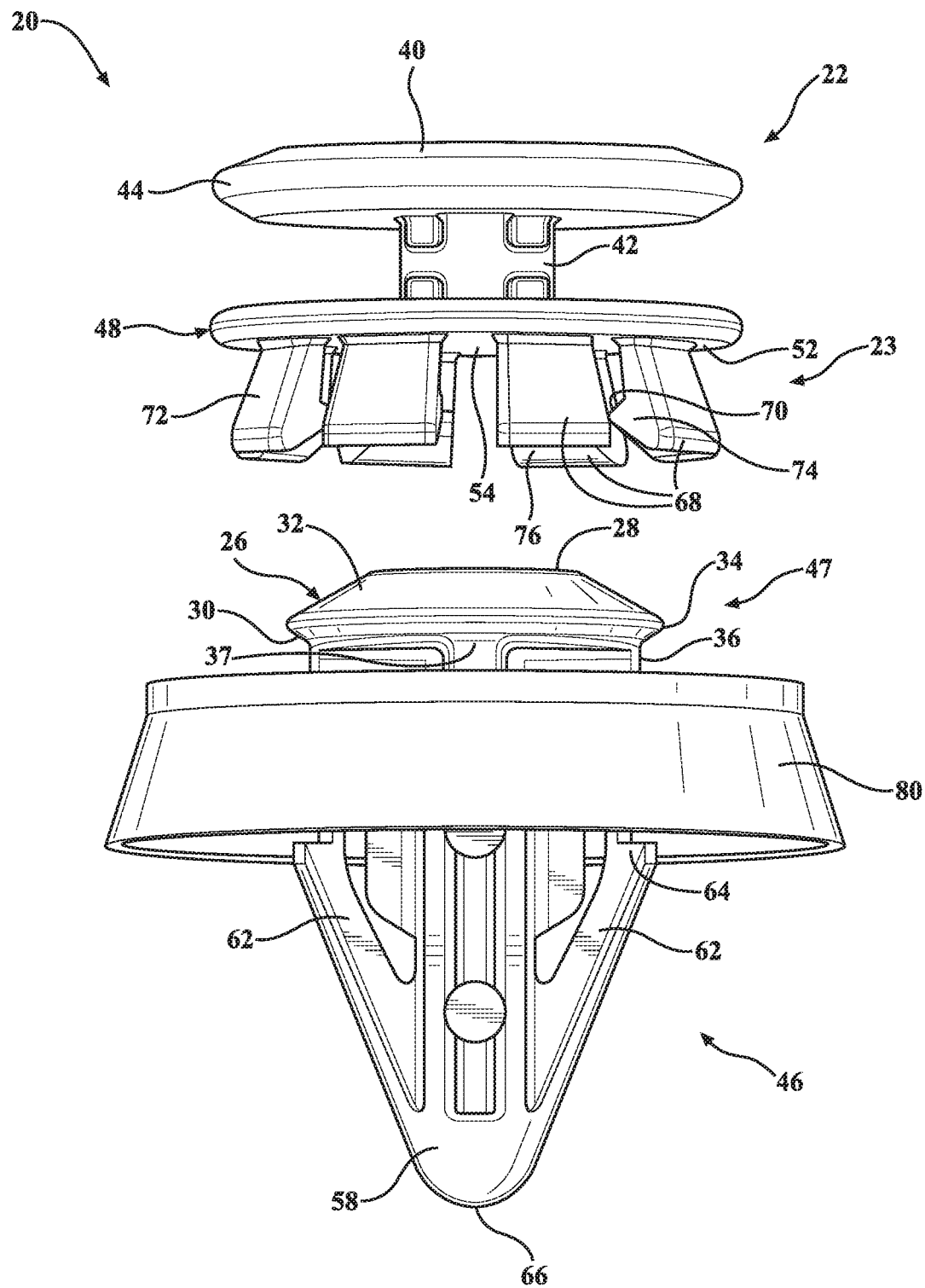
FIG. 7 is a side elevation view of individual components of the panel fastener assembly in accordance with another embodiment of the disclosure.

Accordingly, in various embodiments described herein, the panel fastener assembly 20 is provided in the first configuration, such that the first connector 23 of the panel retainer 22 is the "male" type connector and the second connector 47 of the sheet retainer 46 is the "female" type connector. In this first configuration, as illustrated by the embodiments exemplified in FIGS. 1-9, the panel retainer 22 comprises a head 26, neck 36 and a panel holder 40, with a neck 36 extending between the panel holder 40 and the head 26 such that the head 26 and the panel holder 40 are disposed at opposing ends of the neck 36. In certain embodiments, the panel retainer 22 extends along a central axis 24. In some embodiments, the neck 36 is coaxial with the central axis 24. In some such embodiments, the head 26 and/or the panel holder 40 are also coaxial with the central axis 24 of the panel retainer 22.

As will be understood in view of the description herein, the head 26 is generally adapted to be connected to the second connector 47, and is otherwise not particularly limited. As such, the head 26 may comprise any shape, size, and/or dimension(s) suitable for performing the various functions of the head 26 described herein. For example, the head 26 may comprise a general overall shape that is substantially frustoconical, rectangular, cylindrical, etc., or a portion having such a shape, which may be coaxial or offset with regard to the central axis 24 of the panel retainer 22. Moreover, it is to be appreciated that the head 26 may comprise various sides, surfaces, etc., which may each independently be smooth or textured, continuous or discontinuous, etc., such that the head 26 may comprise or otherwise define protrusions, indentations, cavities, contours, and the like, as well as various combinations thereof.

The head 26 presents a face 28 opposite the neck 36, such that the face 28 generally faces axially outward and away from the neck 36 and the panel holder 40. The face 28 is typically flat or substantially flat, but may be textured and/or contoured. Typically, the face 28 extends along a plane that is perpendicular to the central axis of the panel retainer 22. The head 26 also defines an outer edge 34, where the outer edge 34 defines an external boundary (i.e., an outermost perimeter) of the head 26. In certain embodiments, the head comprises an insertion surface 32 disposed between the outer edge 34 and the face 28. In particular embodiments, the insertion surface 32 extends from the outer edge 34 at a chamfer angle, as described in further detail below. In certain embodiments, the head 26 comprises a generally frustoconical shape tapering from the outer edge 34 to the face 28.

The head 26 comprises a contact surface 30 disposed between the outer edge 34 and the neck 36. In general, the contact surface is disposed opposite the face 28 about the outer edge 34, and typically faces away from the face 28 (i.e., and thus generally toward the panel holder 40). However, the contact surface 30 need not be parallel to the face 28 and/or perpendicular to the central axis 24 of the panel retainer 22, but instead may be off-set with respect to the face 28. For example, in certain embodiments, the contact surface 30 extends radially outward from the neck 36 to the outer edge 34, e.g. along a straight or a curved path. Regardless of particular orientation, the contact surface 30 defines a tangent line 31 that radially interests the central axis 24 of the panel retainer 22 at a contact angle 38. In certain embodiments, the contact surface 30 extends radially outward from the neck 36 to the outer edge 34 and axially toward the face 28, such that the contact angle 38 is obtuse (i.e., greater than 90 degrees). In other embodiments, the contact surface 30 extends radially outward from the neck 36 to the outer edge 34 and axially away from the face 28, such that the contact angle 38 is acute (i.e., less than 90 degrees). In certain embodiments, the contact surface 30 extends radially outward from the neck 36 to the outer edge 34 perpendicular to the central axis 24 of the panel retainer 22, optionally parallel to the face 28, such that the contact angle 42 is a right angle (i.e., 90 degrees).

The neck 36 is not particularly limited with regard to shape, size, dimensions, etc., but instead may comprise any shape, size, and/or dimension(s) suitable for use with the various components of the panel fastener assembly 20 described herein. As such, the neck 36 may comprise any number of sides, surfaces, etc., which may each independently define or otherwise comprise protrusions, indentations, cavities, contours, etc. In certain embodiments the neck 36 comprises a substantially rectangular or cylindrical shape. In particular embodiments, the neck 36 generally comprises an elongated cylindrical shape extending longitudinally between the head 26 and the panel holder 40 coaxial with the central axis 23 of the panel retainer 22. In such embodiments, the neck 36 may comprise an outer surface 37 that lies parallel to the central axis 24 and is likewise intersected by the tangent line 31 defined by the contact surface 30, such that the contact angle 38 may be measured between contact surface 30 of the head 26 and the outer surface 37 of the neck 40.

As introduced above, the panel retainer 22 comprises the panel holder 40 at an opposing end of the neck 36 from the head 26. As will be appreciated in view of the description herein, the panel holder 40 is generally adapted to retain a panel, and is otherwise not particularly limited. As such, the panel holder 40 may generally comprise any shape, size, and/or dimension(s) suitable for performing the various functions of the panel holder 40 described herein (i.e., holding, retaining, and/or being fastened/coupled to a panel). Likewise, the panel holder 40 may comprise any number of sides, surfaces, etc., which may each independently define or otherwise comprise protrusions, indentations, cavities, contours, etc. In general, the panel holder 40 is disposed about the central axis 24, such that components of the panel holder 40 (e.g. those described below) may be defined or otherwise described as radially disposed about the central axis 24.

Typically, the panel holder 40 comprises a shaft 42 and a retaining element 44, alternatively a plurality of retaining elements 44, projecting radially outward therefrom. As will be understood by those of skill in the art, the panel holder 40 so configured may be operatively coupled to a panel by disposing the shaft 42 in an aperture (e.g. a slot or hole) defined by a panel and the retaining elements 44 about opposing surfaces of the panel, thereby retaining the panel there between. The shaft 42 is coextensive from the neck 36, and otherwise is not particularly limited. As such, the shaft 42 may comprise any shape, size, and/or dimension(s) suitable for the structural requirements of the shaft 42 described herein. Likewise, it will be appreciated that the shaft 42 may comprise any number of sides, surfaces, etc., which may each independently define or otherwise comprise protrusions, indentations, cavities, contours, etc. For example the shaft 42 may comprise an overall shape that is substantially cylindrical, rectangular, or a portion having such a shape, which may be coaxial or offset with regard to the central axis 24 of the panel retainer 22. In particular embodiments, the shaft 42 generally comprises an elongated cylindrical shape extending longitudinally coaxial with the central axis 24 of the panel retainer 22. In general, the retaining elements 44 each project radially outward from different points along a length of the shaft 42 and cooperate to secure a panel there between. As such, the retaining elements 44 are not particularly limited and may comprise any shape, size, and/or dimension(s) suitable engaging, holding, being secured, fastened, and/or coupled to, or otherwise operatively engaging a panel. For example, in particular embodiments, each of the retaining elements 44 comprises a disk-like shape having a diameter greater than a diameter of the shaft 42. While but two retaining elements 44 are shown generally in the Figures, it is to be appreciated that more than two retaining elements 44 may be used. For example, in some embodiments the panel holder 40 comprises 3, 4, 5, 6, or more retaining elements 44, which may each be independently selected and the same as or different from any other of the retaining elements 44.

With continued reference to the first configuration, the panel fastener assembly 20 also comprises the sheet retainer 46, which includes the second connector 47 and a sheet anchor 58. In this first configuration, the second connector 47 of the sheet retainer 46 is the "female" type connector.

In general, the sheet retainer 46 extends along a central axis 56, as will be understood in view of the Figures and description herein. The sheet retainer 46 generally includes a body 48. In certain embodiments, the body 48 extends longitudinally along the central axis 56. In specific embodiments, the body 48 is coaxial with the central axis 56. In general, the body 48 may comprise any shape, size, and/or dimension(s) suitable for housing, connecting, or otherwise supporting the various components and/or elements of the sheet retainer 46 described herein. For example, the body 48 may comprise a general overall shape that is substantially rectangular, triangular, cylindrical, or a portion having such a shape, which may be coaxial or offset with regard to the central axis 56. Likewise, it is to be appreciated that the body 48 may comprise various sides, surfaces, etc., which each may independently be smooth or textured, continuous or discontinuous, etc., such that the body 48 may comprise or otherwise define protrusions, indentations, cavities, contours, and the like, as well as various combinations thereof. For example, regardless of the particular geometry, shape, etc., the body generally extends longitudinally between a sheet side 50 and a mating side 52. Typically, the sheet and mating sides 50, 52 of the body 48 are perpendicular to the central axis 56 and are each longitudinally facing (i.e., such that the sheet and mating sides 50, 52 are opposite one another about the body and face away from each other). The mating side 52 typically present a substantially flat mating surface 54 that lies generally perpendicular to the central axis 56.

The sheet anchor 58 generally comprises a shank 60 that extends from the sheet side 50 of the body 48, e.g. along the central axis 56. In general, the shank 60 may comprise any shape, size, and/or dimension(s) suitable for use in the sheet anchor 58, as will be understood by those of skill in the art in view of the description herein. Likewise, it will be appreciated that the shank 60 may comprise any number of sides, surfaces, etc., which may each independently define or otherwise comprise protrusions, indentations, cavities, contours, etc. Typically, the shank 60 extends longitudinally along the central axis 56 between the body 48 and an insertion end 66. In certain embodiments, the shank 60 is coaxial with the central axis 56. In general, the shank 60 is dimensioned to comprise a radial/transverse width (e.g. a diameter taken perpendicular to the central axis 56) that is less than a radial/transverse width of the body 48 taken at the sheet side 50. However, it will be appreciated that the shank 60 need not be consistently shaped or dimensioned along its length. For example, the insertion end 66 of the shank 60 is typically adapted for insertion into an aperture. As such, in some embodiments, the insertion end 66 is typically tapered, angled, pointed, or otherwise comprises a reduced diameter or a diameter reducing toward the central axis away from the body 48.

The sheet anchor 58 also comprises a plurality of arms 62. Each arm 62 projects radially outward from the shank 60 proximal the insertion end 66 and toward the body 48. Each arm 62 can be radially twisted about the shank 60 relative to the central axis 56 (i.e., in a screw-type fashion), straight from the shank 60 toward the body 48 such that each arm 62 is longitudinally coplanar with the shank 60, or transversely from the shank 60 such that each of arms 62 and the shank 60 are not longitudinally coplanar. As will be appreciated in view of the description herein, although but two arms 62 are shown in the Figures, the sheet anchor 58 may comprise more than two arms 62, such that the plurality of arms 62 may comprise 3, 4, 5, 6, or more individual arms 62. The arms 62 are each resiliently deflectable toward the shank 60 (i.e., can be inwardly deflected in response to a deflecting force, but will otherwise return to and/or maintain a natural position relative the shank 60 following the cessation of such a deflecting force). In general, each of the plurality of arms 62 comprises a terminal end 63 adapted to abut a surface of a sheet. In some embodiments, the terminal end 63 presents a surface opposing the sheet side 50 of the body 48. In certain embodiments, each arm 62 comprises a sheet catch 64 located proximal the terminal end 63.

In the first configuration, the sheet retainer 46 also includes a plurality of locking elements 68 disposed radially opposite each other about the central axis 68 at the mating side 52 of the body 48. Generally, the locking elements 68 extend longitudinally outward from the mating side 52 at opposing edges of the mating surface 54. Moreover, each locking element 68 is configured to be resiliently deflectable away from the central axis 56, such as pivotally away from the central axis 56 about the mating side 52. As described in further detail below, the locking elements 68 are configured to retain the head 26 of the panel retainer 22 when the head 26 is disposed there between. In this fashion, the locking elements 68 are adapted for connecting, optionally releasably connecting, together the panel retainer 22 and the sheet retainer 46. The shape of the locking elements 68 are not particularly limited. As such, each of the locking elements 68 and may comprise any shape, size, and/or dimension(s)

suitable for use in retaining the head 26 of the panel retainer 22. Likewise, it will be appreciated that each of the locking elements 68 may be the same as or different from each other, and may comprise any number of sides, surfaces, etc., which may each independently define or otherwise comprise protrusions, indentations, cavities, contours, etc. In general, the locking elements 68 are shaped complementary to the head 26, as will be understood in view of the Figures and description herein. As will be appreciated in view of the description herein, while but two locking elements 68 are shown in FIGS. 1-9, the sheet retainer 46 may comprise more than two locking elements 68, such that the plurality of locking elements 68 may comprise 3, 4, 5, 6, or more individual locking elements 68.

Typically, each locking element 68 comprises a support wall 72 extending longitudinally from the mating side 52 of the body 48 and a flange 74 projecting toward the central axis 56 from the support wall 72. In certain embodiments, the support walls 72 are disposed generally perpendicular to the mating surface 54 and/or extend directly from mating side 52 of the body 48. However, the support walls 72 need not be straight, but may be curved, bent, or even comprise a number of components that are independently coextensive or non-coextensive with each other. In general, each of the flanges 74 extends axially over the mating surface 54 and presents a locking surface 70 spaced from and longitudinally opposing the mating surface 54. In this fashion, the locking elements 68 and the body 48 cooperatively define a channel bounded on one side by the mating surface 54 and on an opposing side by the locking surfaces 70. The locking surfaces 70 can be flat or curved, and may each independently be free from or comprise any number of protrusions, indentations, cavities, contours, etc. Typically, the locking surfaces 70 are substantially flat. In general, each of the locking surfaces 70 defines a tangent line 71 that radially intersects the central axis 56 at a locking angle 78. In certain embodiments, the each locking surface 70 extends radially inward from the support wall 72 toward the central axis 56 and parallel to the mating surface 54, such that the locking angle 78 is a right angle (i.e., 90 degrees). However, while the locking surfaces 70 are generally disposed opposing the mating surface 54, the surfaces need not be parallel to one another. For example, in some embodiments, each locking surface 70 extends radially inward from the support wall 72 toward the central axis 56 and longitudinally toward the mating surface 54, such that the locking angle 78 is acute (i.e., less than 90 degrees). In certain embodiments, each locking surface 70 extends radially inward from the support wall 72 toward the central axis 56 and longitudinally away from the mating surface 54, such that the locking angle 78 is obtuse (i.e., greater than 90 degrees). In certain embodiments, the locking surfaces 70 each extend from a portion of the support wall 72 that is parallel to the central axis 56, such that the locking angle 78 may be measured between each of the locking surfaces 70 and the support wall 72 from which they each radially extend.

In certain embodiments, the flanges 74 are externally tapered or chamfered, such that each of the flanges 74 presents a longitudinal receiving surface 76 opposite the mating side 52. Each receiving surface 76 is generally adapted for outwardly deflecting the locking elements in response to a longitudinal deflection force applied to the receiving surface 76.

In particular embodiments, the sheet retainer 46 comprises a seal 80. In such embodiments, the seal is typically disposed about the body 48 of the sheet retainer 46 such that at least a portion of the seal 80 is disposed adjacent the sheet side 50 of the body 48 (i.e., such that the seal 80 is disposed between the body 48 and a surface of a sheet/panel into which the sheet anchor 58 is disposed). In this fashion, the seal 80 is adapted to provide a water tight seal between the body 48 and a sheet on which the sheet retainer 46 is anchored. Typically, the seal 80 is shaped complementary to the sheet retainer 46 as a whole, or at least a portion thereof. For example, in certain embodiments, the seal 80 is annularly disposed about the body 48 and shaped to provide a snug fit about the body 48. However, it is to be appreciated that the seal 80 is not particularly limited, and may comprise any shape, size, and/or dimension(s), and may comprise any number of sides, surfaces, etc. that may each independently define or otherwise comprise protrusions, indentations, cavities, contours, etc. Moreover, the seal 80 may be releasably coupled to the body 48, or semi-permanently or permanently coupled/attached/fixed to the body 48. For example, in certain embodiments, the seal 80 is integrally formed with one or more other components of the sheet retainer 46 (e.g. the body 48, etc.).

As introduced above, the panel fastener assembly 20 is also provided in the second configuration, such that the first connector 23 of the panel retainer 22 is the "female" type connector and the second connector 47 of the sheet retainer 46 is the "male" type connector. In this second configuration, as illustrated by the embodiments exemplified in FIG. 10, the panel retainer 22 comprises the body 48 and the locking elements 68. In general, the locking elements 68 each extend from the mating side 52 of the body 48 at edges of the mating surface 54. Typically, the locking elements 68 are radially disposed about the central axis 24.

With continued regard to the second configuration, the sheet retainer 46 comprises the head 26 and the neck 36. In general, the neck 36 longitudinally extends from the sheet anchor 58 to the head (26). Typically, the neck 36 extends along the central axis 56. As with the first configuration, the head 26 presents the substantially flat face 28 opposite the neck 36, as well as the contact surface 30 that is disposed between the neck 36 and the outer edge 34 of the head 26.

It is to be appreciated that the description of the various components of the first and second connectors (23, 47) (i.e., the head 26, neck 36, body 48, locking elements 68, etc.) applies to both the first and second configurations, as will be understood by those of skill in the art. For example, the number of locking elements 68 is not limited in the second configuration any more than in the first configuration, such that the plurality of locking elements 68 of the panel fastener assembly 20 may comprise 2, 3, 4, 5, 6, or more individual locking elements 68.

With regard to the panel fastener assembly as a whole (i.e., not limited by particular configuration), the various components, and elements of such components, of the panel fastener assembly 20 described above (e.g. the panel retainer 22 and the sheet retainer 46) may be manufactured of the same or different material(s), such as any one or more of the materials described below. For example, in certain embodiments, the panel retainer 22 is monolithic in construction and substantially homogeneous in composition (e.g. such that the panel holder 40 and the first connector 23 are integrally formed and/or formed of a single piece of material). In these or other embodiments, the sheet retainer 46 is monolithic in construction and substantially homogeneous in composition, and may comprise the same or different material as the panel retainer 22. However, the sheet retainer 46 and/or the panel retainer 22 may each independently comprise multiple components of varying compositions joined together (e.g. via permanent, semi-permanent, or non-permanent connections). Moreover, each component may itself comprise a combination of different materials, and thus may not comprise a homogeneous composition throughout. For example, the seal 80 need not be monolithic with the other components of the sheet retainer 46, but may instead be a separate component comprising a different composition than the rest of the sheet retainer 46. In general, materials suitable for use in or as the panel fastener assembly 20 and/or the components thereof (e.g. the panel retainer 22, the sheet retainer 46, and the various portions thereof) include metals (e.g. steels, aluminums, alloys, etc.), resins (e.g. thermoset and/or thermoplastic resins), and combinations thereof. However, myriad materials may be used to manufacture the components and elements of the panel fastener assembly 20, with each typically being selected as a function of availability, cost, performance/end use applications, etc. As such, metals, metal alloys, and resins are not exhaustive of suitable materials that may be used. Additionally, it is to be appreciated a surface or portion thereof of a particular component of the panel fastener assembly 20 may be coated, painted, and/or impregnated with a material having desired characteristics including, but not limited to, those described above or below. Moreover, one of skill in the art will readily appreciate that particular materials will be selected based on the features and/or functions of the panel fastener assembly 20 or particular components thereof. For example, one of skill in the art will understand that the composition and construction of, for example, the locking elements 68 and the arms 62 will control the force required to deflect these elements and the resiliency of each element in response to such force being applied.

In various embodiments, the panel fastener assembly 20 comprises a resin. In some such embodiments, the panel retainer 22 and the sheet retainer 46 each comprise a resin, which may be the same as or different from the resin of the other component. Examples of suitable resins typically comprise the reaction product of a monomer and a curing agent, although resins formed of self-polymerizing monomers (i.e., those acting as both a monomer and a curing agent) may also be utilized. It is to be appreciated that such resins are conventionally named/identified according to a particular functional group present in the reaction product. For example, the term "polyurethane resin" represents a polymeric compound comprising a reaction product of an isocyanate (i.e., a monomer) and a polyol (i.e., a chain extender/curing agent). The reaction of the isocyanate and the polyol create urethane functional groups, which were not present in either of the unreacted monomer or curing agent. However, it is also to be appreciated that, in certain instances, resins are named according to a particular functional group present in the monomer (i.e., a cure site). For example, the term "epoxy resin" represents a polymeric compound comprising a cross-linked reaction product of a monomer having one or more epoxide groups (i.e., an epoxide) and a curing agent. However, once cured, the epoxy resin is no longer an epoxy, or no longer includes epoxide groups, but for any unreacted or residual epoxide groups (i.e., cure sites), which may remain after curing, as understood in the art. In other instances, however, resins may be named according to a functional group present in both the monomer and the reaction product (i.e., an unreacted functional group).

In some embodiments, the resin is selected from thermoset resins and thermoplastic resins. Examples of suitable thermoset and/or thermoplastic resins typically include polyamides (PA), such as Nylons; polyesters such as polyethylene terephthalates (PET), polybutylene terephthalates (PET), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM) such as acetal homopolymer; polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; urea (e.g. melamine-type); phenoxy resins; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof. In particular embodiments, each of the panel retainer 22 and the sheet retainer 46 comprises an acetal homopolymer, alternatively a polyoxymethylenes (POM) acetal homopolymer.

From the description of the first and second configurations above, it will be appreciated that, in general, the panel retainer 22 includes the panel holder 40 and the first connector 23 (e.g. each disposed at opposing longitudinal ends of the panel retainer 22) and, likewise, the sheet retainer 46 includes the sheet anchor 58 and the second connector 47 (e.g. each disposed at opposing longitudinal ends of the sheet retainer 46). Moreover, it will also be appreciated that one of the first and second connectors (23, 47) comprises the neck 36 longitudinally extending to the head 26, with the head 26 presenting the face 28 (e.g. opposite the neck 36) and the contact surface 30 (e.g. disposed between the neck 36 and the outer edge 34 of the head 26. Furthermore, the other of the first and second connectors (23, 47) comprises the body 48 and the plurality of resiliently deflectable locking elements 68 extending from the mating side 52 of the body 48 (e.g. at edges of the mating surface 54), with each locking element 68 defining the locking surface 70 opposing the mating surface 54.

As introduced above, the panel retainer 22 and the sheet retainer 46 are connectable, optionally releasably connectable, via the first and second connectors (23, 47). More specifically, the head 26 is configured to be disposed in the channel defined by the locking elements 68 and the body 48 (e.g. bounded on one side by the mating surface 54 and on an opposing side by the locking surfaces 70), and the locking elements 68 are configured to operatively engage the head 26 of the panel retainer 22 to couple together the sheet retainer 46 and the panel retainer 22.

In practice, connecting the first and second connectors (23, 47) comprises disposing the face 28 of the head 26 adjacent the mating surface 54 of the body 48, e.g. by disposing the face 28 opposite the mating surface 54 about the flanges 74 of the locking elements 68, aligning the central axes (24, 56) of both retainer components (22, 46), and moving the head 26 longitudinally toward the body 48. During this movement together, the insertion surface 32 of the head 24 contacts and acts against the receiving surfaces 76 of the flanges 74 (e.g. as a deflecting force) to deflect the locking elements 68 outwardly away from the central axes (24, 56), allowing passage of the head 24 there between. Once the face 28 of the head 26 is disposed adjacent the mating surface 54 of the body 48, the locking elements 68 return to their natural positions, thereby disposing the flanges 74 about the head 26 such that the locking surfaces 70 are adjacent, and optionally abut, the contact surface 30 of the head 24, thereby preventing movement of the head 26 away from the body 48 and connecting together the panel retainer 22 and the sheet retainer 46 via the first and second connectors (23, 47).

The design and construction of the panel fastener assembly 20 allows for a sealed, leak-proof installation and usage. In particular, the first and second connectors (23, 47) are separated from the elements used to install each retainer component (22, 46), and are closed off from the interstitial space between panels/sheets fastened therewith by nature of the design of the head 26 and body 48 having no internal passages into which water or other liquids could leak into.

As will be appreciated in view of the Figures and embodiments described herein, the contact angle 38 (i.e., the angle of the contact surface 30 with respect to the central axis 24 or 56) and the locking angle 78 (i.e., the angle of the locking surfaces 70 with respect to the central axis 56 or 24) may be individually and/or collectively tuned to configure connectability of the components of the panel fastener assembly 20 as releasable or non-releasable. In particular, the contact angle 38 and the locking angle 78 determine the ease of disconnecting the components of the panel fastener assembly 20 (i.e., the panel retainer 22 and the sheet retainer 46) when connected together. In general, the force required to disconnect the components of the panel fastener assembly 20 from one another increases as the angles of the contact angle 38 and the locking angle 78 decrease (i.e., become more acute). For example, at maximum acuteness, the contact surface 30 and the locking surface 70 become internal surfaces of barbs that longitudinally trap one another, without imparting the radial force (i.e., during awayward movement) that is necessary to outwardly deflect the locking elements 68 and release the head 26 from there between. Likewise, the force required to disconnect the components of the panel fastener assembly 20 from one another decreases as the angles of the contact angle 38 and the locking angle 78 increase (i.e., become more obtuse). Typically, the angles of the contact angle 38 and the locking angle 78 are selected in view of each other to reinforce the desired functions thereof. For example, in specific embodiments, the contact angle 38 and the locking angle 78 are complementary such that both angles (38, 78) are acute, obtuse, or are substantially right, alternatively are right, angles. However, both angles (38, 78) are independently selected and need not be the same, but may instead be different from one another (e.g. depending on a desired use of the panel fastener assembly 20, etc.). In general, the contact angle 38 and the locking angle 78 are each independently selected from large angles, near-right and/or right angles, and small angles. Examples of large angles include those from 95 to 170 degrees, such as from 95 to 160, alternatively from 95 to 150, alternatively from 95 to 140, alternatively from 95 to 130, alternatively from 95 to 120, alternatively from 95 to 115, alternatively from 95 to 110, degrees. Examples of small angles include those from 5 to 85 degrees, such as from 10 to 85, alternatively from 20 to 85, alternatively from 30 to 85, alternatively from 40 to 85, alternatively from 50 to 85, alternatively from 60 to 85, alternatively from 70 to 85, degrees. Examples of near-right or right angles include those from 85 to 95 degrees, where 90 degrees defines a right angle.

A method of fastening together a panel (shown generally at 82 in FIGS. 1 and 2) and a sheet (shown generally at 84 in FIGS. 1 and 2) using the panel fastener assembly 20 is also disclosed. The method comprises installing the panel retainer 22 on the panel 82, anchoring the sheet retainer 46 to the sheet 84, and connecting together the panel retainer 22 and the sheet retainer 46 (i.e., via the first and second connectors (23, 47)). The method generally prepares an assembly, shown generally at 88 in FIG. 2, which comprises the panel 82 and the sheet 84 substantially parallel to one another and fastened together via the panel fastener assembly 20.

In general, the panel retainer 22 is installed on the panel 82 via the panel holder 40, such that the shaft 52 is disposed through a thickness of the panel 82 and the retaining elements 44 are disposed on opposing sides/faces of the panel 82. However, the panel retainer 22 may be installed on the panel 82 via any technique or combination of techniques known in the art. For example, in certain embodiments, installing the panel retainer 22 on the panel 82 comprises integrally forming the panel retainer 22 and the panel 82 (e.g. during manufacturing of one of these components, such as via injection molding, overmolding, etc.). In certain embodiments, installing the panel retainer 22 on the panel 82 comprises disposing the panel holder into a large aperture defined by the panel 82 until the retaining elements are disposed on opposing sides of the panel 82, and sliding the panel retainer 22 into a slot and/or smaller aperture (e.g. a keyhole slot) of the panel 82 to prevent withdrawal of the panel retainer 22 therefrom. Of course, various other methods and/or combinations of methods of installation may also be utilized.

Typically, the sheet retainer 46 is anchored to the sheet 84 via the sheet anchor 58. As such, anchoring (i.e., installing) the sheet retainer 46 typically comprises inserting the sheet anchor 58 into an aperture 86 defined by the sheet 84. As will be understood by those of skill in the art in view of the description herein, the sheet anchor 58 is generally a push-type fastener, such that the arms 62 of the sheet anchor 58 inwardly deflect (i.e., toward the shank 60) during insertion into the aperture 86. Once through the aperture 84, the arms 62 are resiliently biased toward their natural, undeflected positions, and will thus expand outward about the aperture 86 to contact the sheet 84 and prevent removal of the sheet anchor 58 therefrom. During insertion, the sheet catch 64 may act to prevent premature removal (i.e., prior to the sheet anchor 58 being fully disposed within the aperture 86).

In general, connecting the panel retainer 22 and the sheet retainer 46 includes disposing the face 28 of the head 26 adjacent the mating surface 54 of the body 48, e.g. by disposing the face 28 parallel to and opposite the mating surface 54 about the flanges 74 of the locking elements 68, aligning the central axes (24, 56) of both retainer components (22, 46), and moving the head 26 longitudinally toward the body 48 to outwardly deflect the locking elements 68 until the face 28 is adjacent the mating surface 54 and the locking elements 68 return to their original position, thereby disposing the locking surfaces 70 adjacent the contact surface 30 of the head 26 and to preventing movement of the head 26 away from the body 48.

It is to be appreciated that the particular actions of the method can be performed in any order. For example, in certain embodiments the method comprises connecting together the panel retainer 22 and the sheet retainer 46 subsequent to installing both retainer components (22, 46). In other embodiments, the method comprises connecting together the panel retainer 22 and the sheet retainer 46 prior to installing the panel retainer 22 and/or anchoring the sheet retainer 46. In some such embodiments, the method comprises connecting together the panel retainer 22 and the sheet retainer 46 after installing but one of the retainer components (22, 46), and then installing the other of the retainer components (22, 46).

It is also to be appreciated that the method may be repeated any number of times using any number of sheets and/or panels. For example, in some embodiments, more than one of the panel fastener assembly 20 are utilized to fasten together a single sheet and a single panel. In some embodiments, however, the method is utilized to fasten together one sheet and a plurality of panels, one panel and a plurality of sheets, or both.

It is further to be appreciated that the panel(s) and sheet(s) described herein are not limited, and may be any component, or any element of a component, that the panel holder 40 and/or the sheet anchor 58 can be fixed to. As such, one of skill in the art will readily appreciate that the terms "panel" and "sheet" may be overlapping in scope, and encompass structures, components, elements, etc., such as surfaces of doors, pieces of trim, etc.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular. Further, it is to be understood that the terms "right angle", "orthogonal", "perpendicular", and "parallel" are generally employed herein in a relative and not an absolute sense. Further, it will be appreciated that the terms "substantially", "about", "essentially", etc. indicate minor deviations of the property being modified. Such deviation may be of from 0-10%, alternatively of from 0-5%, alternatively of from 0-3% of a particular property.

Likewise, it is also to be understood that the appended claims are not limited to express and particular assemblies, systems, or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention claimed is:

1. A panel fastener assembly, comprising:
   a panel retainer comprising a panel holder and a first connector disposed at opposing longitudinal ends of the panel retainer; and
   a sheet retainer comprising a sheet anchor and a second connector disposed at opposing longitudinal ends of the sheet retainer;
   wherein one of the first and second connectors comprises a neck longitudinally extending to a head, the head presenting a substantially flat face opposite the neck and a contact surface disposed between the neck and an outer edge of the head, the outer edge defining an outermost perimeter of the head, the contact surface extending along a straight path from the neck to the outer edge, and the head including an insertion surface disposed between the outer edge and the flat face, the insertion surface extending from the outer edge at a chamfer angle such that the head has a generally frustoconical shape from the outer edge to the face;
   wherein the other of the first and second connectors comprises a body having an outwardly facing longitudinal mating side presenting a mating surface, and a plurality of resiliently deflectable locking elements extending from the mating side of the body at edges of the mating surface radially disposed about a central axis, each locking element of the plurality of locking elements being configured to be resiliently deflectable away from the central axis, and each locking element defining a flat locking surface opposing the mating surface;
   wherein the contact surface defines a tangent line that radially intersects the central axis at a contact angle, the contact surface extending radially outwardly from the neck such that the contact angle is obtuse;
   wherein each locking element comprises a support wall perpendicular to the mating side of the body and a flange projecting radially inward from the support wall to present the locking surface over and longitudinally opposing the mating surface, the flange being perpendicular to the support wall such that the locking surface is parallel to the mating surface, and the support wall being resiliently deflectable away from the central axis; and wherein the panel retainer and the sheet retainer are connectable via the first and second connectors, such that when the face of the head is disposed adjacent the mating surface of the body the locking surface of each locking element is disposed about the contact surface of the head to prevent awayward movement between the head and the body, thereby connecting together the panel retainer and the sheet retainer.

2. The panel fastener assembly of claim 1, wherein each locking surface describes a tangent line intersecting the central axis at a locking angle.

3. The panel fastener assembly of claim 1, wherein the first and second connectors are configured such that the panel retainer and the sheet retainer are releasably connectable.

4. The panel fastener assembly of claim 1, wherein the panel holder comprises a shaft extending for a length from the first connector and a retaining element projecting radially outward from the shaft.

5. The panel fastener assembly of claim 1, wherein the sheet anchor comprises a shank extending from the second connector to an insertion end and a plurality of arms projecting outwardly from the shank proximal the insertion end and toward the second connector, the arms being resiliently deflectable toward the shank.

6. The panel fastener assembly of claim 1, wherein the sheet retainer further comprises a seal disposed about the second connector such that a portion of the seal is disposed adjacent a sheet side of the second connector.

7. The panel fastener assembly of claim 1, wherein: (i) the head and the neck are monolithic in construction; (ii) the body and the locking elements are monolithic in construction; or (iii) both (i) to (ii).

8. The panel fastener assembly of claim 1, wherein the first connector comprises the neck and the head and the second connector comprises the body and the locking elements, and wherein: (i) the panel holder and the neck are monolithic in construction; (ii) the sheet anchor and the body and are monolithic in construction; or (iii) both (i) to (ii).

9. The panel fastener assembly of claim 1, wherein the first connector comprises the body and the locking elements and the second connector comprises the neck and head, and wherein: (i) the panel holder and the body are monolithic in construction; (ii) the sheet anchor and the neck are monolithic in construction; or (iii) both (i) to (ii).

10. The panel fastener assembly of claim 1, wherein: (i) the panel retainer comprises a polymeric material; (ii) the sheet retainer comprises a polymeric material; or (iii) both (i) to (ii).

11. The panel fastener assembly of claim 1, wherein: (i) the panel retainer is operatively fastened to a panel via the panel holder; or (ii) the panel retainer is integrally formed with a panel.

12. The panel fastener assembly of claim 1, wherein the sheet retainer is operatively fastened to a sheet via the sheet anchor.

* * * * *